United States Patent
Jordan (10) Patent No.: US 7,243,926 B2
(45) Date of Patent: Jul. 17, 2007

(54) RUNNER SLED THAT IS TWISTABLE DURING STEERING

(75) Inventor: Jeffrey Thomas Jordan, Vienna, VA (US)

(73) Assignee: Reindeer Sled Company, Vienna, VA (US)

( * ) Notice: Subject to any disclaimer, the term of this patent is extended or adjusted under 35 U.S.C. 154(b) by 52 days.

(21) Appl. No.: 10/756,294

(22) Filed: Jan. 14, 2004

(65) Prior Publication Data

US 2004/0145132 A1    Jul. 29, 2004

Related U.S. Application Data

(60) Provisional application No. 60/440,312, filed on Jan. 16, 2003.

(51) Int. Cl.
  *B62B 9/04*    (2006.01)
(52) U.S. Cl. .................. 280/21.1; 280/22; 280/22.1
(58) Field of Classification Search ............. 280/22, 280/21.1, 28.11, 22.1, 24, 25, 28.13, 17, 19, 280/18
  See application file for complete search history.

(56) References Cited

U.S. PATENT DOCUMENTS

| | | | | |
|---|---|---|---|---|
| 333,224 A * | 12/1885 | Marsh | ......... | 280/17 |
| 381,665 A | 4/1888 | Allen | | |
| 408,681 A | 8/1889 | Allen | | |
| 634,267 A | 10/1899 | Morgan | | |
| 883,882 A * | 4/1908 | Hlghland | ......... | 280/22 |
| 944,773 A | 12/1909 | Clay | | |
| 1,049,601 A | 1/1913 | Reeve | | |
| 1,052,734 A * | 2/1913 | Maul | ......... | 280/22 |
| 1,066,445 A | 7/1913 | Beardsley | | |
| 1,104,799 A * | 7/1914 | Himebaugh | ......... | 280/22 |
| 1,127,673 A * | 2/1915 | Pearson | ......... | 280/22 |
| 1,253,338 A * | 1/1918 | Beebe | ......... | 280/22 |
| 1,253,425 A * | 1/1918 | Rogers | ......... | 280/22 |
| 1,256,417 A * | 2/1918 | Woods | ......... | 280/22 |
| 1,330,095 A * | 2/1920 | Sherwood | ......... | 280/22 |
| 1,367,185 A * | 2/1921 | Holmgren | ......... | 280/12.11 |
| 1,423,732 A | 7/1922 | Pixley | | |
| 1,455,032 A * | 5/1923 | Skupien | ......... | 280/22 |
| 1,472,711 A * | 10/1923 | Zukowski | ......... | 280/22 |
| 1,501,271 A * | 7/1924 | Colson | ......... | 280/22 |
| 1,589,110 A * | 6/1926 | Caronia | ......... | 280/22 |
| 1,658,490 A * | 2/1928 | Lorusso | ......... | 280/22 |
| 2,006,326 A * | 6/1935 | Scholtes | ......... | 280/22 |
| 2,027,128 A * | 1/1936 | Tessmer | ......... | 280/22 |
| 2,446,452 A * | 8/1948 | Benson | ......... | 280/22 |
| 2,499,639 A | 3/1950 | Forseth | | |
| 2,520,861 A | 8/1950 | Stone | | |
| 2,526,100 A * | 10/1950 | Weirick | ......... | 280/22 |
| 2,559,452 A | 7/1951 | McLellan | | |

(Continued)

*Primary Examiner*—Hau Phan
(74) *Attorney, Agent, or Firm*—Harness, Dickey & Pierce, P.L.C.

(57) ABSTRACT

A sled includes a pair of runners that are formed from a single, continuous, hollow plastic pipe. The runners are fixed to a platform at three locations: the rear ends of the runners curve upward and are attached to the rear end of the seat, while intermediate portions of the runners are attached to downwardly extending legs of the seat. The forward ends of the runners curve upward and support a footrest via retainers. The seat and the footrest are connected together by a rope. The runners are twistable during a steering operation.

18 Claims, 8 Drawing Sheets

U.S. PATENT DOCUMENTS

| | | | |
|---|---|---|---|
| 2,568,070 A * | 9/1951 | Holbrook | 280/22 |
| D196,444 S | 10/1963 | Ciborowski | |
| 3,180,652 A | 4/1965 | Johansson | |
| D206,668 S | 1/1967 | Stoddard | |
| 4,326,725 A * | 4/1982 | Lagervall | 280/22 |
| 4,530,509 A | 7/1985 | Maxwell, Jr. | |
| 4,718,684 A | 1/1988 | Rabatic | |
| 5,335,925 A | 8/1994 | Dolson | |
| 5,509,665 A * | 4/1996 | Hansen | 280/22.1 |
| 5,573,257 A | 11/1996 | Olivieri | |
| 6,139,031 A | 10/2000 | Wingard | |
| 6,349,950 B1 * | 2/2002 | Levy et al. | 280/22 |

* cited by examiner

RUNNER SLED THAT IS TWISTABLE DURING STEERING

CROSS-REFERENCE TO RELATED APPLICATIONS

This U.S. nonprovisional patent application claims priority under 35 U.S.C. § 119 from Provisional Application No. 60/440,312 (filed on Jan. 16, 2003), the entire content of which is incorporated herein by reference.

BACKGROUND OF THE INVENTION

Conventional runner sleds are steered by flexing or bending portions of the runners in the direction that the rider wishes to go. The runners cut into the snow and provide lateral forces that produce the desired turn. Although such runner sleds are generally thought to provide acceptable performance, they are not without shortcomings.

In particular, conventional runner sleds provide limited maneuverability in that only a few inches of the runner near the front of the sled are actually flexed (or bent) into an arc. The limited flexing action results from the runner being rigidly attached to the sled body. In most cases, the forward end, the rear end, and an intermediate portion of the runner are rigidly attached to the sled body. Moreover, conventional wisdom is to provide additional support (usually in the form of bracing) between the runner and the sled body to achieve structural integrity. The rigid attachments between the runners and the sled body (as well as the bracing) limit the flexing action of the runners, thereby decreasing the maneuverability of the runner sled.

Furthermore, a steering mechanism is provided on the forward end of the runner sled. During a sled run, the rider grasps the steering mechanism and pulls it, thereby causing the runners to flex in the desired direction. According to convention, the steering mechanism is connected to the sled body via a rigid connecting member. Due to the rigidity of the connecting member, shocks encountered at the front end of the sled (e.g., due to bumps in the terrain) are transferred to the sled body. The result is a stiff, uncomfortable sled ride.

SUMMARY OF THE INVENTION

An object of the present invention is to provide a runner sled having improved maneuverability, shock absorbing characteristics, and safety characteristics. The invention resides in a sled having a platform, and a pair of runners that are fixed to the platform. A steering member is mounted on forward ends of the runners, and a rope extends between the platform and the steering member.

The steering member has apertures through which the runners extend. The shape of each aperture transitions from a circular opening at the top of the steering member to an elongated oval opening at the bottom of the steering member. This allows each runner to pivot inside the corresponding aperture at the circular opening at the top of the steering member. This pivot action causes each runner to twist about its longitudinal axis when the steering member is operated to steer the sled. Each aperture has an inner diameter that is greater than the outer diameter of the runner, so that each runner may rotate in the corresponding aperture. Since the forward ends of both runners are free of bracing (which is conventionally provided between the runners and the platform for structural integrity), the steering member may roll relative to the platform. Retainers are mounted on the runners to limit the movement of the steering member along the lengths of the runners.

The above and other features of the invention including various and novel details of construction and combinations of parts will now be more particularly described with reference to the accompanying drawings and pointed out in the claims. It will be understood that the particular sled embodying the invention is shown by way of illustration only and not as a limitation of the invention. The principles and features of this invention may be employed in varied and numerous embodiments without departing from the scope of the invention.

DETAILED DESCRIPTION OF THE INVENTION

I. The Sled:

In the exemplary, non-limiting embodiment of the invention depicted in FIGS. 1-6, the sled 100 includes a pair of runners 5 that are fixed to a platform 10 (or seat). The forward ends of the runners 5 curve upward and support a steering member, which in the preferred embodiment is a footrest 20. The seat 10 and the footrest 20 are connected together by a rope 30.

The runners 5 are formed from a continuous, hollow plastic pipe 6. The rear ends of the runners 5 curve upward and are attached to the rear end 12 of the seat 10, while intermediate portions of the runners 5 are attached to downwardly extending legs 14 of the seat 10. The intermediate portions of the runners 5 are spaced apart and define a reference plane 200 that is generally parallel to the terrain across which the sled 100 traverses.

Figure 3:
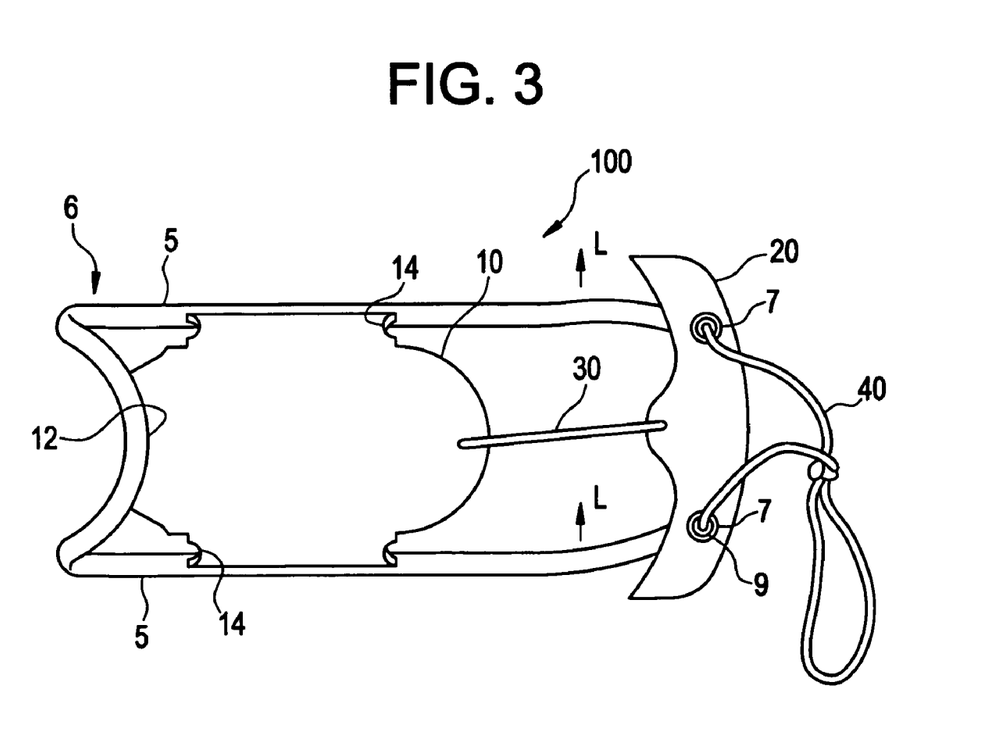
FIG. 3 is plan view of the sled in FIG. 1, with runners in a laterally flexed condition.
Figure 4:
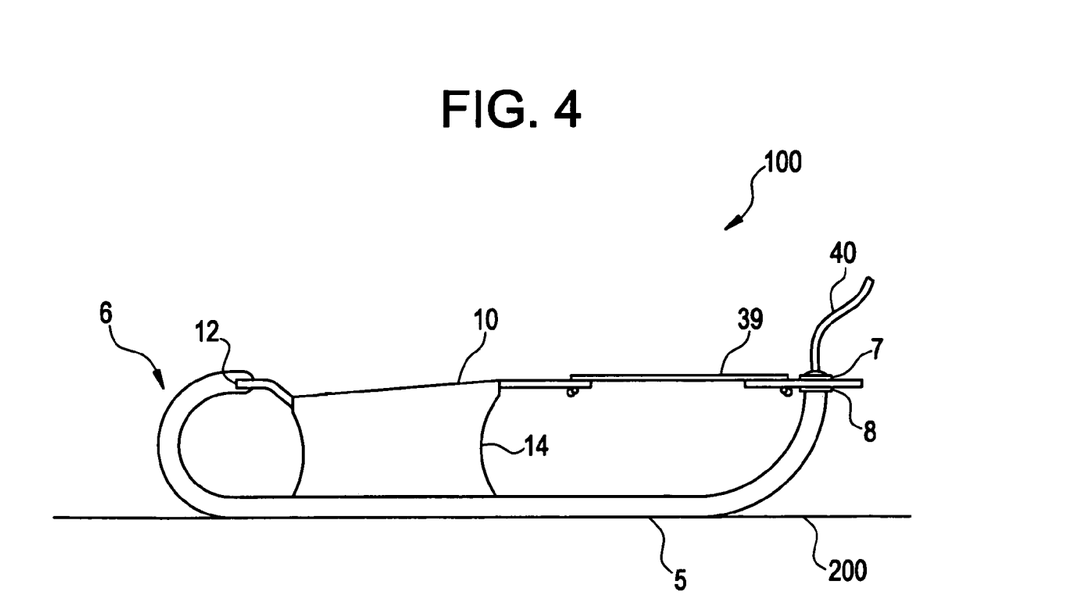
FIG. 4 is a side elevation view of the sled in FIG. 1.
Figure 5:
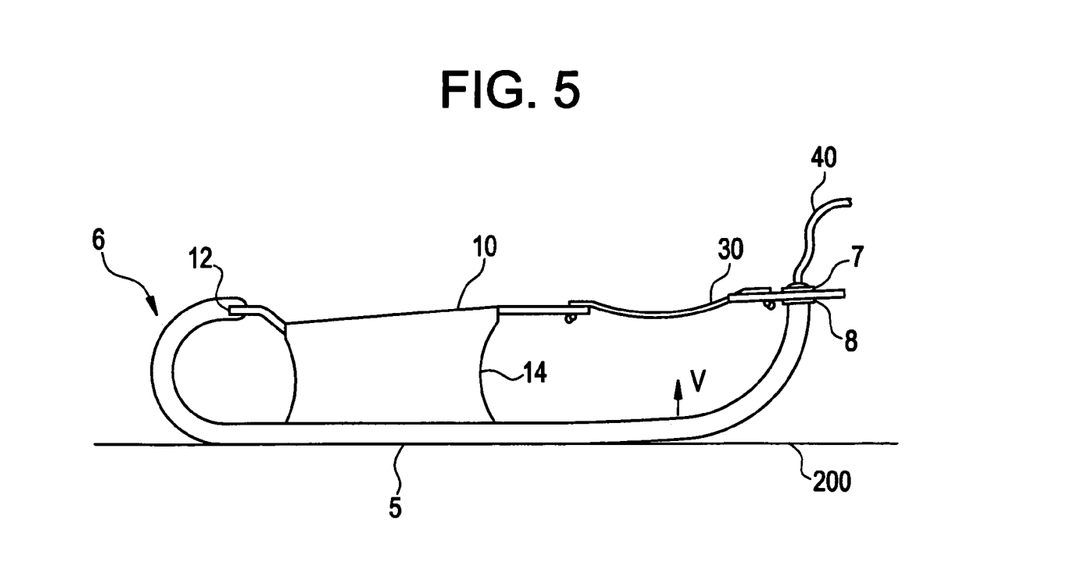
FIG. 5 is a side elevation view of the sled in FIG. 1, with runners in a vertically flexed condition.
Figure 6:
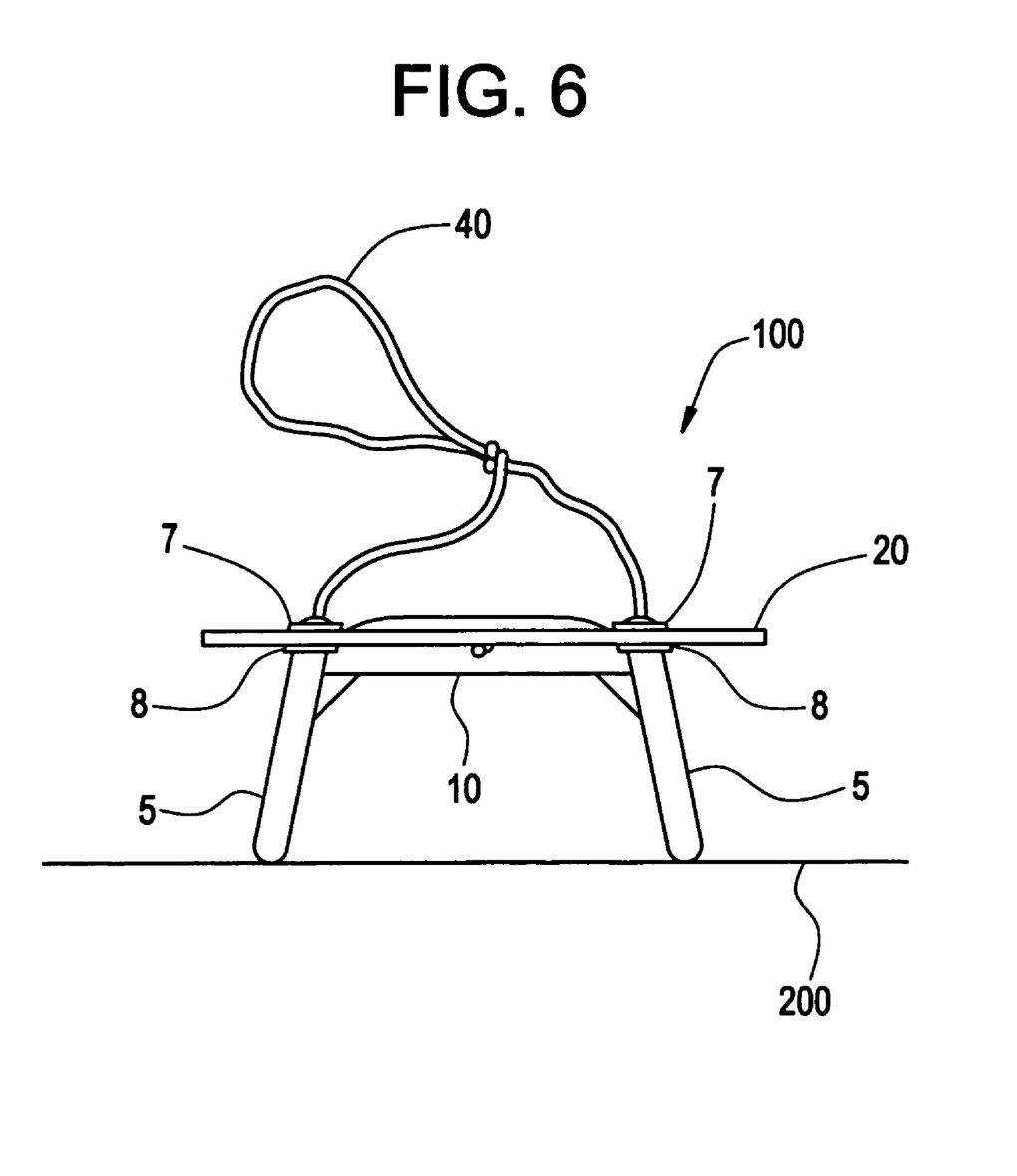
FIG. 6 is a front elevation view of the sled in FIG. 1.

The runners 5, which are preferably circular in cross section, are sufficiently strong to carry the loads imposed upon them without providing additional reinforcements, such as bracing between the runners and the seat. This results in a long forward portion (i.e., the portion extending forward of the seat 10) on each runner 5 being free of structural restraints, and therefore flexible in any direction with "memory" to bring the runner 5 back into shape. For example, FIG. 3 shows the forward portion of the runners 5 flexed in a lateral direction L, while FIG. 5 shows the forward portion of the runners 5 flexed in a vertical direction V.

Figure 7:
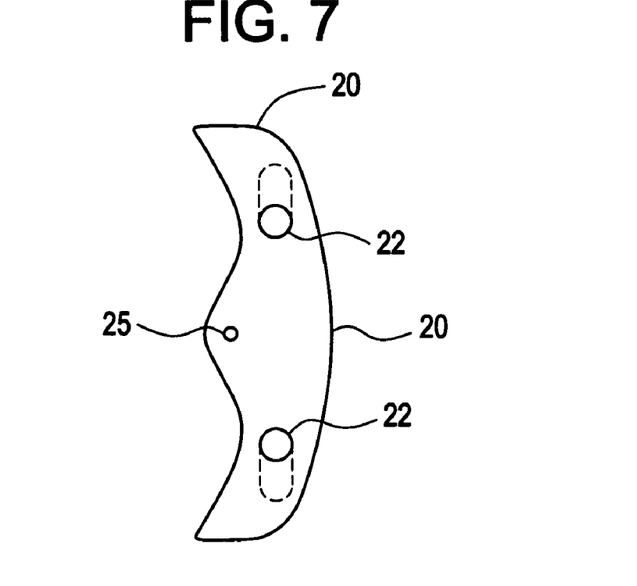
FIG. 7 is plan view of a steering member according to a illustrative, non-limiting embodiment of the present invention.
Figure 8:
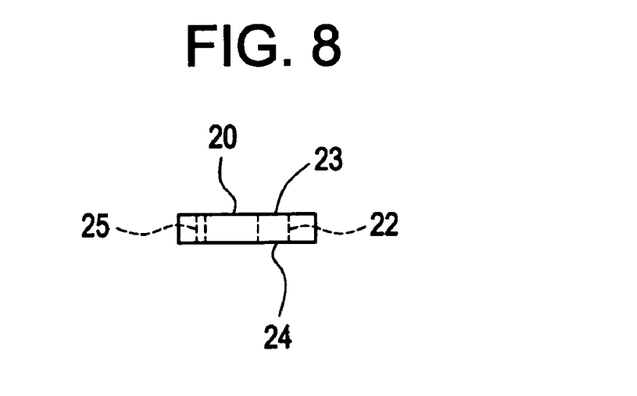
FIG. 8 is a side elevation view of the steering member in FIG. 7.
Figure 9:
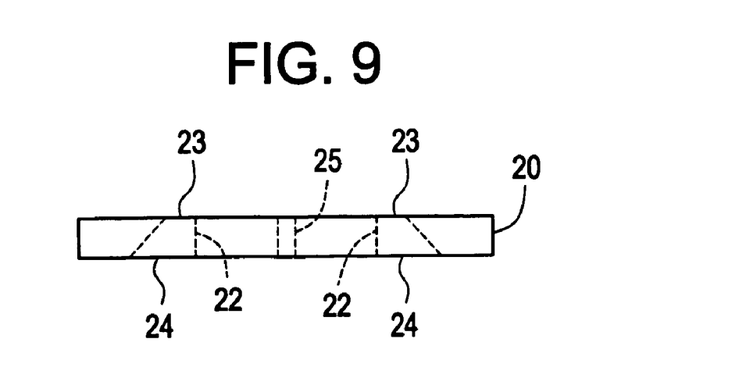
FIG. 9 is a front elevation view of the steering member in FIG. 7.

The footrest 20 is mounted for rotation on the forward ends of the runners 5. As shown in FIGS. 7-9, the footrest 20 has three apertures 22, 25. Each runner 5 extends through a laterally located aperture 22, while the rope 30 extends through a centrally located aperture 25.

Each aperture 22 is defined by a frusto-conical surface that tapers toward the top of the footrest 20. Preferably, each aperture 22 transitions from an upper opening 23 having a circular shape to a lower opening 24 having an elongated oval shape. The circular opening 23 has a diameter that is slightly greater than the outer diameter of the runner 5 so that the runner 5 may rotate freely in the aperture 22. The circular openings 23 function to maintain the runners 5 in a predetermined spaced apart fashion. As shown in FIGS. 7 and 9, the long axes of the oval shaped openings 24 extend in the lateral (transverse) direction of the sled 100. The runner 5 may pivot inside the aperture 22 at the circular opening 23. During this pivot action, the oval shaped openings 24 serve as slots through which the runners 5 pass. It will be appreciated that the frusto-conical surfaces of the apertures 22 guide and limit the pivot action of the runners 5. The rotation and pivot action of the runners 5 within the apertures 22 will become more apparent in view of the steering operation discussed below.

Figure 1:
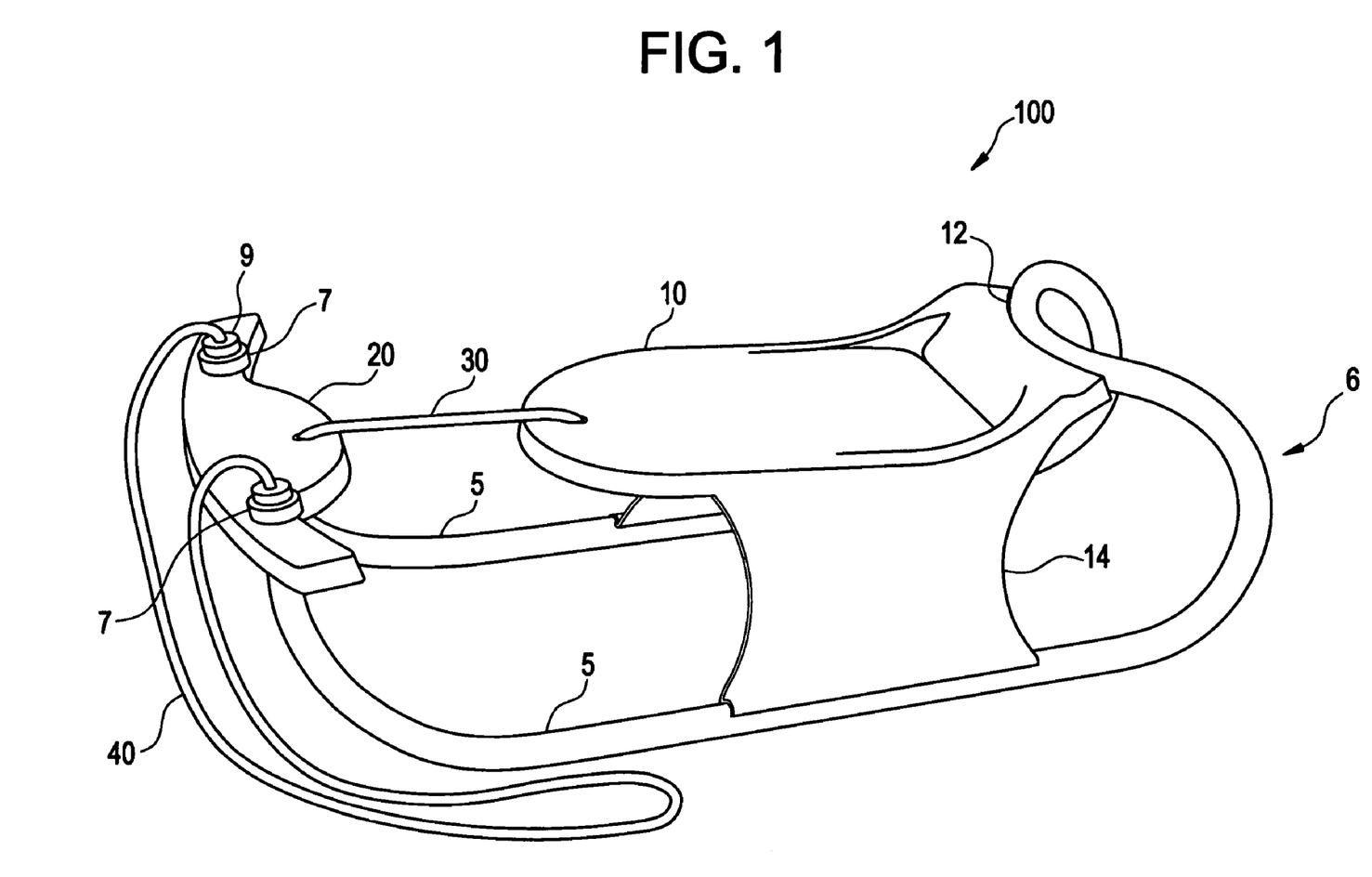
FIG. 1 is a perspective view of a sled according to an illustrative, non-limiting embodiment of the present invention.
Figure 2:
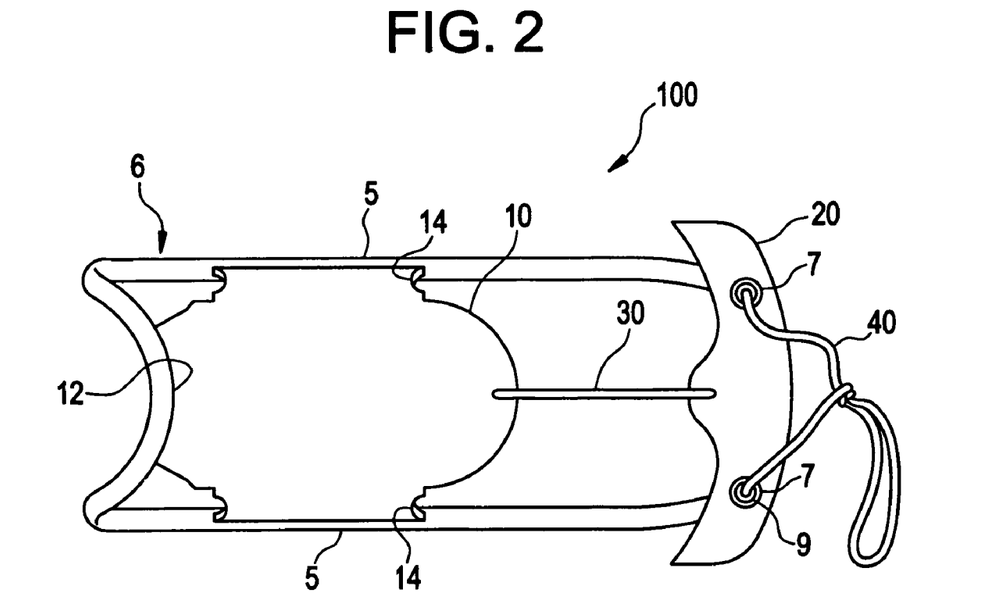
FIG. 2 is plan view of the sled in FIG. 1.

Retainers are provided to limit the travel of the footrest 20 along the lengths of the runners 5. In this exemplary embodiment, and with reference to FIGS. 4 and 5, the retainers are in the form of collars 7, 8. Two collars 7, 8 are mounted on each runner 5 and on opposite sides of the footrest 20. As shown in FIGS. 2 and 3, the collars 7, 8 extend all the way around the runners 5. It is to be appreciated that other alternative retainers may be employed so long as they limit the travel of the footrest 20 along the length of the runners 5 and at the same time allow the runners 5 to rotate and pivot within the apertures 22 of the footrest 20.

The seat 10 and the footrest 20 are connected together by a rope 30. The rope 30 is preferably preloaded with tension. The rope 30 limits the longitudinal movement of the footrest 20 (together with the forward ends of the runners 5) away from the seat 10 under the weight of a rider's legs.

In this specification, the term "rope" means any elongated member (e.g., a line or a cord) that transmits force only when tensioned. In other words, one cannot push a rope. It is to be appreciated that a rope may have some degree of stiffness due to the material from which it is fabricated, its thickness, its structure, etc. For purposes of this application, however, such stiffness is negligible so long as the rope 30 allows the desirable movements of the footrest 20 relative to the seat 10 described below.

The rope 30 allows the footrest 20 to move in several desirable directions relative to the seat 10 that provide improved steering control and riding comfort. First, the rope 30 allows the footrest 20 to pivot and rotate in a lateral plane relative to the seat 10. The lateral pivot action of the footrest 20 occurs about the point at which the rope 30 connects to the seat 10, while the lateral rotation action of the footrest 20 occurs about the point at which the rope 30 connects to the footrest 20.

Second, the rope 30 allows the footrest 20 to move toward the seat 20 and in a vertical direction relative to the seat 20. It will be appreciated that when the runners 5 experience bumps in the terrain, then the footrest 20 will be driven upward, thereby causing the rope 30 to become slack, as shown in FIG. 5 (for example). This shock absorbent feature provides a smoother ride as compared to conventional runner sleds.

And third, the rope 30 allows the footrest 20 to roll relative to the seat 10. The rolling action of the footrest 20 occurs about the longitudinal axis of the sled 100. The desirable movements of the footrest 20 relative to the seat 10 will become more apparent in view of the steering operation discussed below.

A handle rope 40 is fixed to the front ends of the runners 5. The handle rope 40 is grasped by the rider for stability, and used to carry the sled across the terrain. The handle rope 40 may be fixed to the runners 5 via end caps 9 inserted into the front ends of the runners 5. Such end caps 9 (and other alternative) fasteners are well known in this art, and therefore a detailed description of the same is omitted.

In a preferred embodiment, all of the constituent elements of the sled 100, inclusive of the rope 30 and the handle rope 40, are fabricated from plastic materials. The plastic components may be fastened together via a liquid adhesive agent to chemically fuse the parts together, thereby yielding both economical assembly and extreme durability. Often the joint is stronger than the component parts. Liquid adhesives are well known in this art, and therefore a detailed description of the same is omitted.

II. The Steering Operation:

As an initial matter, the term "starboard" refers to the right-hand side of the sled 100, as taken from the rider's perspective, and the term "port" refers to the left-hand side of the sled 100, as taken from the rider's perspective. Further, the term "outboard" refers to a location away from the longitudinal center of the sled 100, while the term "inboard" refers to a location toward the longitudinal center of the sled 100.

The sled 100 is ridden in the fetal position so that the rider's legs lead the rest of the body. The rider sits upright on the seat 10, places his feet on the footrest 20, and grasps the handle rope 40. When riding in this position, most of the rider's weight is transferred through the seat 10 to the rigidly braced rear portion of the runners 5. The remainder of the rider's weight, which is concentrated on the footrest 20, is applied to the flexible front portion of the runners 5 to achieve steering. The sloping edges of the footrest 20 and a small backrest on the seat 10 help the rider resist reactionary forces caused by steering and help maintain proper positioning on the sled 100.

The maneuverability of the sled 100 is controlled by the footrest 20. More specifically, the interaction between the rope 30 and the footrest 20 causes off-centered forward forces (from the rider's legs) to be applied as lateral forces to the front end of each runner 5. Consider FIG. 10, which is a partial plan view of the sled 100 making a port side turn.

Figure 10:
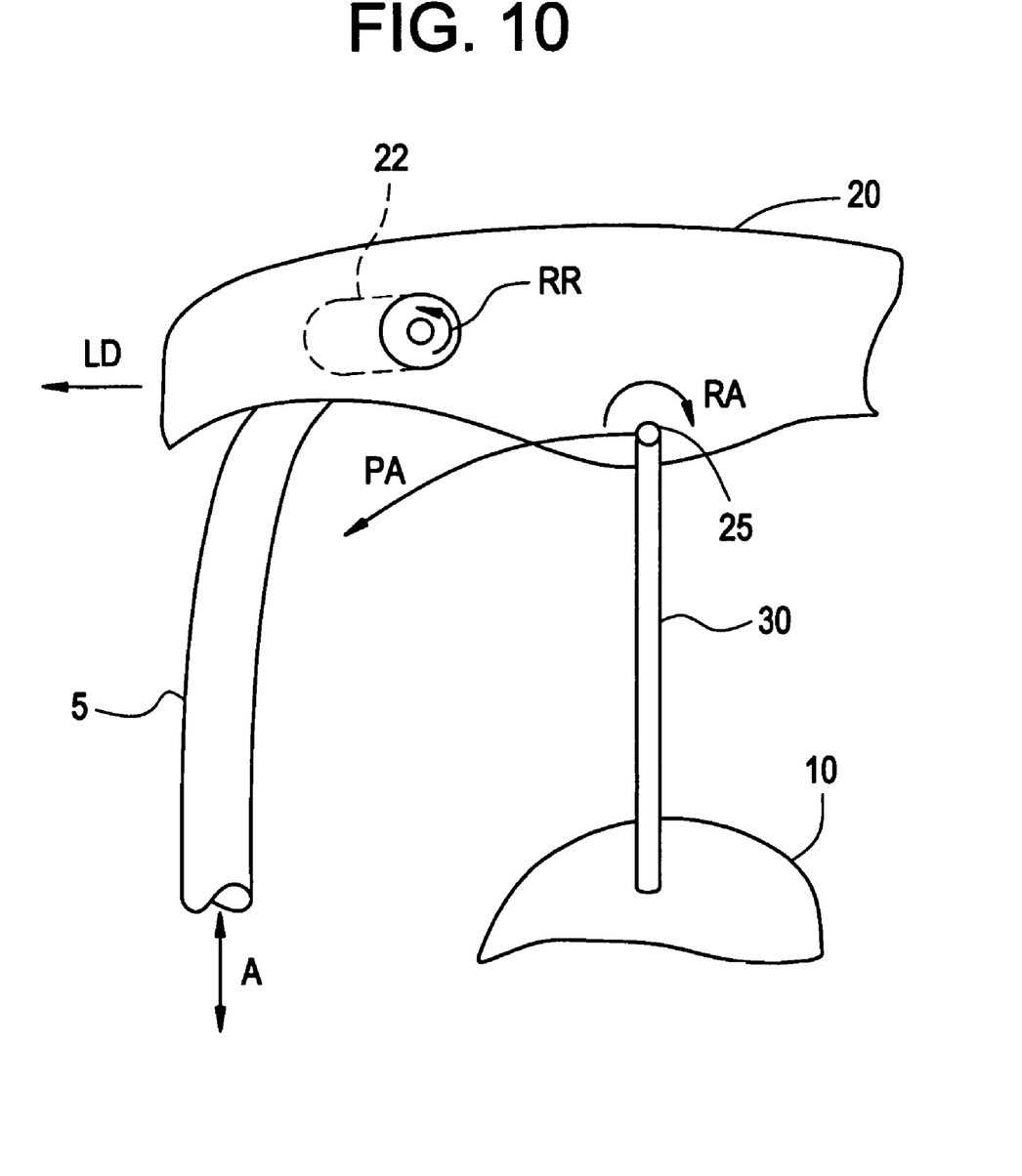
FIG. 10 is a partial plan view of the sled in FIG. 1 showing a lateral displacement of the steering member and the front end of the runner during a steering operation.

As shown in FIG. 10, when the rider's left leg exerts pressure on the port side of the footrest 20, the footrest 20 pivots and rotates relative to the seat 10 in a lateral plane. The lateral pivot action (arrow PA) of the footrest 20 occurs about the point at which the rope 30 connects to the seat 10, while the lateral rotation action (arrow RA) of the footrest 20 occurs about the point at which the rope 30 connects to the footrest 20. The pivot and rotation actions result in a lateral displacement (arrow LD) in the port direction of the footrest 20 and the forward end of the runner 5. The lateral displacement (arrow LD) occurs relative to the seat 10. As a result, the runners 5 bend parabolically along their lengths (which is similar to the steering feature provided by conventional runner sleds). In addition, the runners 5 pivot within the apertures 22 of the footrest 20, the runners 5 twist about their neutral axes, and the footrest 20 rolls relative to the platform 10. Each of these motions will be discussed separately below.

Figure 11:
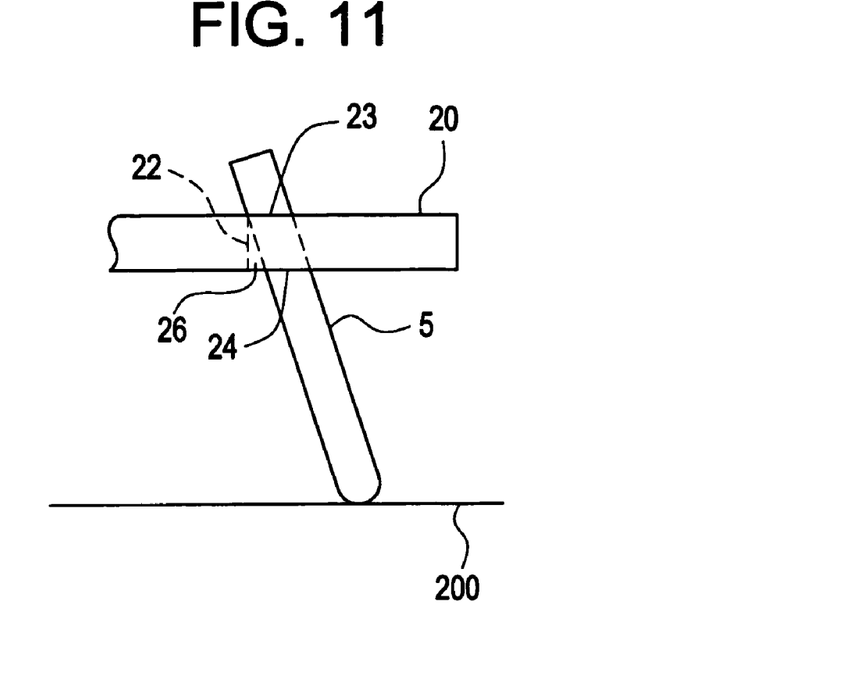
FIG. 11 is a partial, front elevation view of the sled in FIG. 1.
Figure 12:
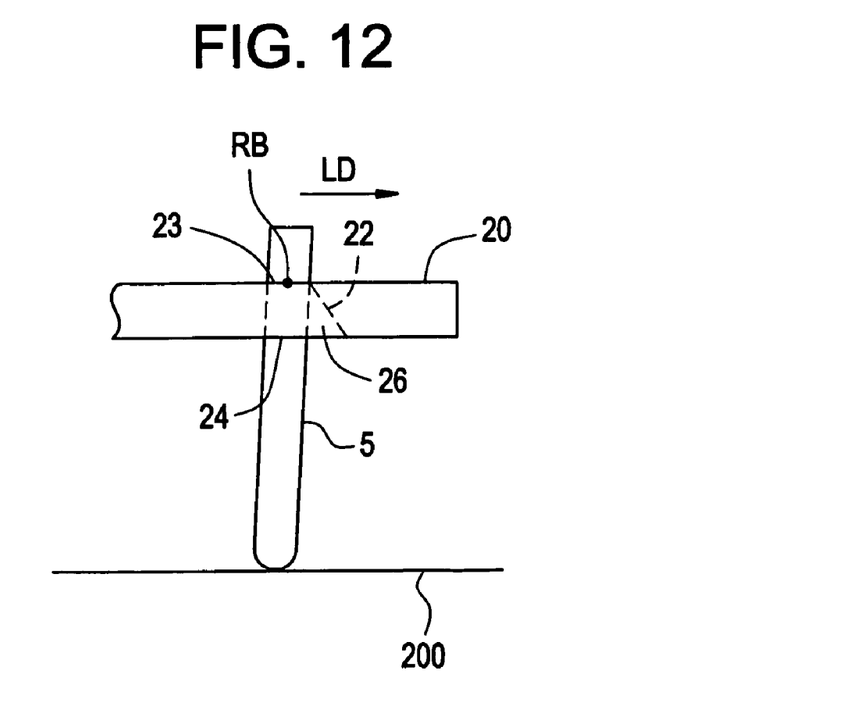
FIG. 12 is a partial, front elevation view of the sled in FIG. 1, with the runner in a pivoted condition.

A. The Pivot Action of the Runners:

The pivot action of the runners 5 will be appreciated with reference to FIGS. 11 and 12, which show partial front views of only the footrest 20 and the port side runner 5 for clarity. FIG. 11 depicts the relative orientation of the parts when the sled 100 is not being steered. As shown, the outboard surface of the runner 5 abuts against the entire length of the outboard portion of the aperture's frusto-conical surface. In this condition, a gap 26 exists between the inboard surface of the runner 5 and the inboard portion of the aperture's frusto-conical surface.

FIG. 12 depicts the relative orientation of the parts when the sled 100 is being steered in the port direction. As described above, the footrest 20 and the forward end of the runner 5 are laterally displaced (arrow LD) in the port direction. The lateral displacement (arrow LD) occurs relative to the seat 10. And since the rear portion of the runner 5 is rigidly braced by the seat 10, when the footrest 20 and the front end of the runner 5 are laterally displaced (arrow LD) relative to the seat 10, the runner 5 pivots from the initial inclined condition shown in FIG. 11 to the less inclined position shown in FIG. 12. Preferably, the pivot action occurs at the opening 23. Preferably, the pivot action occurs about an axis RB, which extends into the drawing sheet and through the opening 23.

When the runner 5 pivots within the aperture 22 relative to the footrest 20, the runner's outboard surface moves away from the outboard portion of the aperture's frusto-conical surface, and the runner's inboard surface moves toward the inboard portion of the aperture's frusto-conical surface. Further, the runner 5 slides though the oval shaped opening 24 (i.e., the runner 5 moves from the outboard side of the opening 24 to the inboard side of the opening 24).

It will be appreciated that the pivot action of the runner 5 (relative to the footrest 20) is limited and guided by the aperture's frusto-conical surface. For example, in an extremely tight port turn, the runner's inboard surface will abut against the inboard portion of the aperture's frusto-conical surface, as shown in FIG. 12. In this condition, further pivoting of the runner 5 within the aperture 22 is prevented.

B. The Twisting Action of the Runners:

During a steering operation, the runner 5 experiences twisting along its longitudinal length. It is to be appreciated that a twisting action is practically and conceptually different than a simple bending action. For example, a member being twisted experiences shear strains, while a member being bent experiences compressive and tensile strains (but not shear strains).

The runner's twisting action is achievable due to the pivot action of the runner 5 relative to the footrest 20 and the rear end of the runner 5 being rotatably fixed to the seat 10. This pivot action is facilitated by the front end of the runner 5 being rotatably provided within the aperture 22 of the footrest 20.

Figure 13:
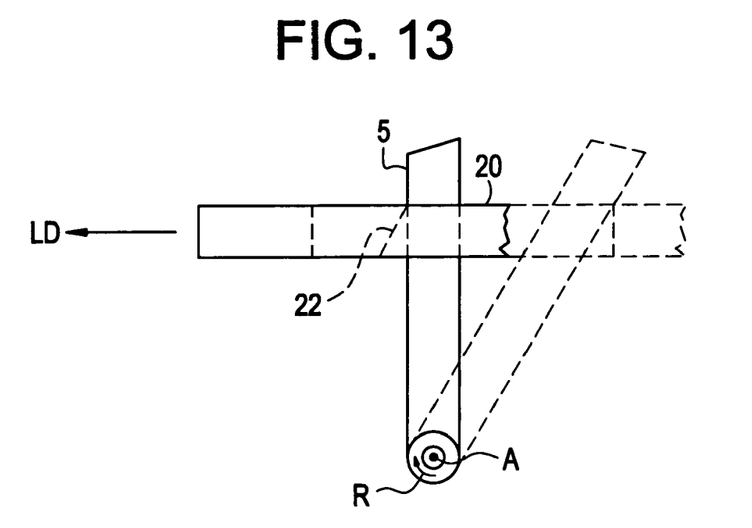
FIG. 13 is a partial schematic view illustrating the twisting action of the runner.

The twisting action of the runner 5 will be appreciated with reference to FIG. 13, which is a partial, rear elevation view of only the footrest 20 and the port side runner 5 for clarity. That is, the view of FIG. 13 is taken from the rear of the sled looking forward at the footrest 20.

In FIG. 13, which depicts a port turn scenario (similar to the ones depicted in FIGS. 10 and 12), the footrest 20 and the forward end of the runner 5 are laterally displaced (arrow LD) in the port direction from the initial position shown in phantom. The lateral displacement (arrow LD) occurs in a plane that is spaced apart from the neutral axis A of the runner's intermediate section. And during the lateral displacement (arrow LD), the frusto-conical shape of the aperture 22 allows the forward end of the runner 5 to pivot relative to the footrest 20. Further, the forward end of the runner 5 is rotatable within the aperture 22 of the footrest 20; and the rear end of the runner 5, which is rigidly braced by the seat 10, is rotationally fixed. Consequently, the lateral displacement (arrow LD) of the front end of the runner 5, in combination with a reaction force (arrow R) arising from the fixed rotational position of the rear end of the runner 5, results in the runner 5 being twisted along its longitudinal length. It will be appreciated that the twisting primarily occurs in the portion of the runner 5 that is forward of the seat 10.

The twisting of the runner 5 will also be appreciated via an explanation of the relative rotation that occurs between the forward end of the runner 5 and the footrest 20. When the forward end of the runner 5 laterally moves (arrow LD) together with the footrest 20, a relative rotational movement (which is readily observable) occurs between the forward end of the runner 5 and the footrest 20.

On the one hand, and turning back to FIG. 10, some of the relative rotation between the runner 5 and footrest 20 is attributable to (1) the pivot action (arrow PA) of the footrest 20 in a lateral plane about the point at which the rope 30 connects to the seat 10, and (2) the rotation action (arrow RA) of the footrest 20 itself in a lateral plane about the aperture 25. These pivot and rotation movements are not associated with the twisting of the runner 5.

On the other hand, some of the relative rotation between the runner 5 and the footrest 20 is attributable to the forward end of the runner 5 actually rotating relative to its initial rotational position. That is, due to the upstanding orientation of the front end of the runner 5 relative to the intermediate section of the runner 5, the lateral movement (arrow LD) of the footrest 20 causes the forward end of the runner 5 to rotate (arrow RR) within the aperture 22 of the footrest 20. Furthermore, as stated above, the rear end of the runner 5 is rigidly braced by the seat 10, and is therefore rotationally fixed. The rotational movement (arrow RR) of the front end of the runner 5 corresponds to the extent of the twisting experienced by the runner 5 along its longitudinal length.

The twisting phenomenon is achievable because of the runner's pivot action within the aperture 22 and because the rear end of the runner 5 is rotatably fixed to the seat 1. This pivot action is facilitated by the front end of the runner 5 being rotatably provided within the aperture 22 of the footrest 20. In contrast, conventional wisdom is to connect the parts together so that the runner is prevented from pivoting relative to the steering member, and in most cases so that the runner is rotationally fixed to the steering member. This type of construction merely causes the runner to experience simple bending (but not twisting) during a steering operation. This is because a runner cannot be twisted if both ends of the same are rotationally fixed to the sled.

C. The Rolling Action of the Footrest:

During a steering operation, the pressure applied to the footrest 20 may cause the footrest 20 to roll relative to the seat 10. This rolling action will be appreciated with reference to FIG. 14, which is a partial, front elevation of only the footrest 20 and the seat 10.

Figure 14:
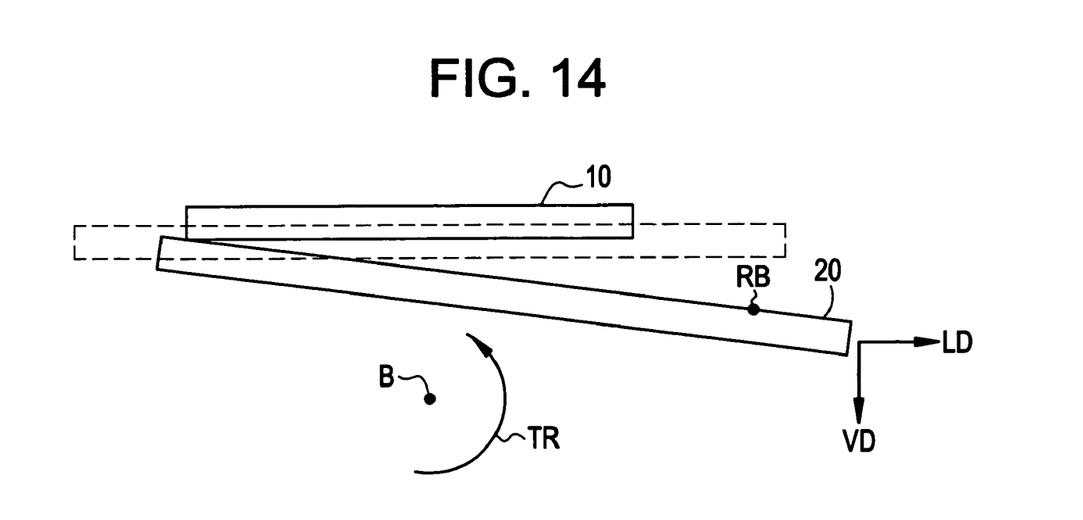
FIG. 14 is a partial schematic view illustrating the rolling action of the steering member relative to the platform.

FIG. 14 depicts a port side turning scenario in which the footrest 20 is moved from an initial position (shown in phantom) to a steered position. As shown, the port side of the footrest 20 may (under the influence of the rider's leg pressure) move through a downward vertical displacement (arrow VD) relative to the initial position. This vertical displacement (arrow VD) is in addition to the lateral displacement (arrow LD) of the footrest 20.

Both the vertical displacement (arrow VD) and the lateral displacement (arrow LD) of the footrest 20 are relative to the seat 10. Therefore the seat 10, which is rigidly braced to the runners 5, creates a twist reaction force (arrow TR). In this way, the sled 100 experiences a macro twist about the longitudinal axis B of the sled.

The shaped apertures 22 facilitate the rolling of the footrest 20. Specifically, the apertures 22 are shaped to allow the footrest 20 to rotate about an axis RB that is parallel to the longitudinal axis B of the sled 100. Preferably, the axis RB extends through the circular opening 23 of the aperture 22, as shown in FIG. 12. In FIG. 12, as well as in FIG. 14, the axis RB extends into the page. It will be appreciated that the rotation of the footrest 20 about the axis RB is similar to the pivot action of the runners 5 described above in section II. A.

The rolling action of the footrest 20 is particularly advantageous since such rolling will cause the port runner 5 to cut deeper into the snow, thereby enhancing the runner's rudder like effect in producing the desired turn. Furthermore, the rope 30 facilitates the rolling action of the footrest 20. That is, the rope 30 only limits the longitudinal movement of the footrest 20 (together with the forward ends of the runners 5) away from the seat 10. It does not, however, inhibit any other movements of the footrest 20 relative to the seat 10.

Although the pivot action (section II. A.), the twist action (section II. B.), and the roll action (section II. C.) were described separately above, it will be appreciated that during a sled run all three actions may occur in concert.

Due to the features described above, the sled according to the present invention provides improved maneuverability, stability, and comfort during a sled ride. The disclosed steering system provides smooth and deliberate handling. Moreover, the sled maintains dynamic stability even while steering at top speed.

What is claimed is:

1. A sled comprising:
    a platform;
    a runner connected to the platform; and
    a steering member mounted on the runner for rotation about an axis that is parallel to a longitudinal axis of the sled;
    wherein the steering member is provided with an aperture through which the runner extends; and
    wherein the aperture extends from the top to the bottom of the steering member.

2. The sled according to claim 1, wherein the steering member is laterally moveable relative to the platform to twist the runner.

3. The sled according to claim 1, comprising:
    a rope extending between the platform and the steering member.

4. The sled according to claim 1, comprising a pair of the runners.

5. The sled according to claim 4, wherein the pair of runners are in the form of one continuous tubular member.

6. The sled according to claim 4, wherein the steering member is a footrest.

7. A sled comprising:
    a platform;
    a pair of runners connected to the platform, such that rear ends of the runners are fixed relative to the platform; and
    a steering member rotatably mounted on forward ends of the runners;
    wherein the steering member is moveable relative to the platform to twist the runners;
    wherein the steering member is provided, with apertures through which each of the runners extend.

8. The sled according to claim 7, comprising:
    a rope extending between the platform and the steering member.

9. The sled according to claim 7, wherein the pair of runners are in the form of one continuous tubular member.

10. The sled according to claim 7, wherein the steering member is a footrest.

11. The sled according to claim 7, wherein each of the apertures is defined by a frusto-conical surface.

12. The sled according to claim 7, comprising:
    a pair of retainers mounted on each runner, the pair of retainers provided on opposite sides of the steering member.

13. A sled comprising:
    a platform;
    a pair of runners connected to the platform;
    a steering member mounted on the runners; and
    a rope having one end connected to the platform and another end pivotally connected to the steering member;
    wherein the steering member is provided with apertures through which each of the runners extend.

14. The sled according to claim 13, wherein the rope is preloaded with tension.

15. The sled according to claim 13, wherein the pair of runners are in the form of one continuous tubular member.

16. The sled according to claim 13, wherein each of the apertures is defined by a frusto-conical surface.

17. The sled according to claim 13, comprising:
    a pair of retainers mounted on each runner, the pair of retainers provided on opposite sides of the steering member.

18. A sled comprising:
    a platform;
    a pair of runners connected to the platform, the pair of runners being spaced apart from each other in a transverse direction of the sled;
    a steering member mounted on the runners; and
    a link preloaded with tension, the link interconnecting a transverse center of the steering member with a transverse center of the platform;
    wherein the steering member is provided with apertures through which each of the runners extend.

* * * * *